US012790230B2

(12) United States Patent
Liu et al.

(10) Patent No.: US 12,790,230 B2
(45) Date of Patent: Nov. 10, 2026

(54) PREPARATION METHOD OF TERNARY PRECURSOR

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Genghao Liu, Foshan (CN); Changdong Li, Foshan (CN); Yongguang Li, Foshan (CN); Weiquan Li, Foshan (CN); Dingshan Ruan, Foshan (CN); Yong Cai, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 553 days.

(21) Appl. No.: 18/374,544

(22) Filed: Sep. 28, 2023

(65) Prior Publication Data

US 2024/0025760 A1 Jan. 25, 2024

Related U.S. Application Data

(63) Continuation of application No. PCT/CN2022/095671, filed on May 27, 2022.

(30) Foreign Application Priority Data

Aug. 17, 2021 (CN) ........................ 202110944650.1

(51) Int. Cl.

| | |
|---|---|
| ***H01M 4/525*** | (2010.01) |
| ***C01G 53/40*** | (2025.01) |
| *H01M 4/505* | (2010.01) |

(52) U.S. Cl.

CPC .......... *C01G 53/40* (2013.01); *C01P 2004/03* (2013.01); *C01P 2004/61* (2013.01);

(Continued)

(58) Field of Classification Search

None

See application file for complete search history.

(56) References Cited

FOREIGN PATENT DOCUMENTS

| | | | |
|---|---|---|---|
| CN | 102244239 | * | 11/2011 |
| CN | 103178257 | A | 6/2013 |

(Continued)

OTHER PUBLICATIONS

International Search Report of PCT Patent Application No. PCT/CN2022/095671 issued on Aug. 24, 2022.

*Primary Examiner* — Sheng H Davis

(74) *Attorney, Agent, or Firm* — Westbridge IP LLC

(57) ABSTRACT

The present disclosure discloses a preparation method of a ternary precursor, including: S1: mixing a first metal salt solution with a soluble nickel salt, a soluble cobalt salt, and a soluble manganese salt, ammonia water, and a sodium hydroxide solution, adjusting a pH, and heating and stirring a resulting mixture to allow a reaction; and aging and filtering a resulting slurry to obtain a precursor seed crystal; S2: adding the precursor seed crystal to a dilute acid solution, and stirring and filtering a resulting mixture to obtain an acidified seed crystal; and S3: mixing a second metal salt solution with a soluble nickel salt, a soluble cobalt salt, and a soluble manganese salt, a sodium hydroxide solution, and the acidified seed crystal, adjusting a pH, and heating and stirring a resulting mixture to allow a reaction;

(Continued)

and aging, filtering, and drying a resulting slurry to obtain the ternary precursor.

7 Claims, 2 Drawing Sheets

(52) U.S. Cl.
CPC ...... *C01P 2006/10* (2013.01); *C01P 2006/12* (2013.01); *C01P 2006/40* (2013.01); *H01M 4/505* (2013.01); *H01M 4/525* (2013.01)

(56) References Cited

FOREIGN PATENT DOCUMENTS

| | | | | | |
|---|---|---|---|---|---|
| CN | 105399154 | A | | 3/2016 | |
| CN | 108807968 | A | | 11/2018 | |
| CN | 108807976 | A | | 11/2018 | |
| CN | 109546144 | | * | 3/2019 | |
| CN | 109546144 | A | | 3/2019 | |
| CN | 111180819 | A | * | 5/2020 | ............ H01M 10/54 |
| CN | 111807425 | A | | 10/2020 | |
| CN | 111987305 | A | | 11/2020 | |
| CN | 112366308 | | * | 2/2021 | |

* cited by examiner

PREPARATION METHOD OF TERNARY PRECURSOR

CROSS-REFERENCE TO RELATED APPLICATIONS

The present application is a continuation application of PCT application No. PCT/CN2022/095671 filed on May 27, 2022, which claims the benefit of Chinese Patent Application No. 202110944650.1 filed on Aug. 17, 2021. The contents of all of the aforementioned applications are incorporated by reference herein in their entirety.

TECHNICAL FIELD

The present disclosure belongs to the technical field of lithium-ion battery (LIB) cathode materials, and specifically relates to a preparation method of a ternary precursor.

BACKGROUND

With high energy density and cycling performance, ternary LIBs have become preferred batteries for electric vehicles with large endurance mileage. Ternary precursors are one of the basic materials for preparing ternary LIBs, and thus the performance of ternary precursors plays an important role in the battery capacity and stability. In recent years, in order to cope with the rapid development of power vehicles, many ternary precursor manufacturers in China start to establish new factories and improve production capacity, which leads to higher and higher performance requirements and lower and lower cost requirements on ternary precursors. Moreover, lithium iron phosphate (LFP) batteries have excellent safety performance, which causes a substantial impact on the ternary material market and constantly drives the breakthroughs in ternary LIBs.

Currently, ternary precursors are basically produced by the co-precipitation method, where NaOH is used as a precipitating agent and ammonia water is used as a complexing agent. That is, materials are continuously pumped into a reactor, and a stirring speed, a reaction temperature, a pH value, an ammonia concentration, and a solid content each are controlled within a specified range, such that a ternary precursor is obtained through continuous nucleation and gradual crystal growth to a specified particle size. The presence of ammonia water allows nickel, cobalt, and manganese with different solubility products to complex with ammonia and be homogeneously precipitated out, thereby obtaining precursor particles with slow growth, uniform composition, thick primary particles, high sphericity, and high tap density. However, the use of ammonia water inevitably results in a large amount of ammonia-nitrogen wastewater, which increases a cost of wastewater treatment and a production cost of a precursor. Moreover, ammonia water is easy to volatilize, thus causing harm to the environment and human health. In view of this, it is necessary to study the production processes of low-ammonia and ammonia-free precursors. In the related art, a method for preparing a high-performance LIB ternary cathode material at a low ammonia concentration (which is equal to or lower than 0.1 mol/L), which does not fundamentally solve the problem of ammonia-nitrogen wastewater and increases a production cost due to the introduction of an ammonium salt as a raw material. In the related art, a method for preparing a precursor of a nickel-cobalt-manganese multi-element LIB cathode material is disclosed, which does not use ammonia water as a complexing agent. However, prepared precursor particles are agglomerates of multiple particles, which not only have a large number of interfaces, but also have a low overall sphericity.

As a reaction starts without ammonia water as a complexing agent, nickel, cobalt, and manganese are rapidly precipitated out, such that particles have inconsistent compositions and initial particles have high surface energy, which results in easy agglomeration to form deformed agglomerated spheres with multiple interfaces and makes it difficult to form complete spherical particles after further growth. Therefore, it is of great value to study a method of using ammonia water to prepare a seed crystal and then allowing the seed crystal to grow in the absence of ammonia, which can not only reduce a cost of wastewater treatment, but also produce a precursor with high sphericity and high specific surface area (SSA). However, this method also has some difficulties. For example, because a seed crystal prepared in the presence of ammonia water has thick primary particles and primary particles grown in the absence of ammonia are thin, a seed crystal stage and a growth stage cannot be well connected, and re-nucleation easily occurs to form deformed agglomerated particles, such that the originally added spherical seed crystal does not play an inherent growth-guiding role.

SUMMARY

The present disclosure is intended to solve at least one of the technical problems existing in the prior art. In view of this, the present disclosure provides a preparation method of a ternary precursor.

According to one aspect of the present disclosure, a preparation method of a ternary precursor is provided, including the following steps:

- S1: mixing a first metal salt solution containing a soluble nickel salt, a soluble cobalt salt and a soluble manganese salt with ammonia water and a sodium hydroxide solution, adjusting pH, performing a reaction under heating and stirring to obtain a slurry; aging and filtering the slurry to obtain a precursor seed crystal;
- S2: adding the precursor seed crystal to a dilute acid solution, stirring and filtering a resulting mixture to obtain an acidified seed crystal; and
- S3: mixing a second metal salt solution containing a soluble nickel salt, a soluble cobalt salt and a soluble manganese salt with a sodium hydroxide solution and the acidified seed crystal, adjusting pH and performing a reaction underheating and stirring; and aging, filtering, and drying a resulting slurry to obtain the ternary precursor.

In some embodiments of the present invention, in S1, the pH is 10 to 13.

In some embodiments of the present invention, in S1, the heating is conducted at 40° C. to 80° C.

In some embodiments of the present invention, in S1, particles in the slurry have a particle size D50 of 1.5-4 μm.

In some embodiments of the present invention, in S2, the dilute acid solution is one or more selected from the group consisting of hydrochloric acid, sulfuric acid, nitric acid, and perchloric acid; and preferably, the dilute acid solution has a concentration of 0.1-1 mol/L.

In some embodiments of the present invention, in S2, the stirring is conducted for 0.5-2 h.

In some embodiments of the present invention, in S3, the heating is conducted at 40-80° C.

In some embodiments of the present invention, in S3, the pH is 9.0 to 12.0.

In some embodiments of the present invention, in S3, particles in the slurry have a particle size D50 of 3-12 μm.

In some embodiments of the present invention, the first metal salt solution and the second metal salt solution may be the same or different. When the two metal salt solutions are the same, the obtained precursor has a consistent composition, and when the two metal salt solutions are different, the obtained precursor is a material with a concentration gradient.

In some implementations of the present disclosure, S3 may specifically include: adding the acidified seed crystal and water to the reactor, and starting stirring and heating; introducing an inert gas, and adding the sodium hydroxide solution to the reactor to adjust the pH; and simultaneously pumping the sodium hydroxide solution and the second metal salt solution to allow a reaction, during which a reaction pH is constantly adjusted to control the nucleation and growth of precursor particles, a supernatant in the reactor is filtered out to keep a liquid level highly stable, and particles continuously grow to a target particle size.

According to a preferred implementation of the present disclosure, the present disclosure at least has the following beneficial effects:

1. In the present disclosure, ammonia water is used as a complexing agent in the seed crystal preparation stage, such that metal ions can be slowly and uniformly precipitated out, the phenomenon of agglomeration of multiple particles into deformed secondary particles in the absence of ammonia does not easily occur, and the obtained seed crystal has high sphericity and excellent dispersibility. The seed crystal preparation stage takes a very short time in the whole reaction process, but the amount of the seed crystal obtained is enough to support multiple experiments.
2. In the present disclosure, the precursor seed crystal is added to the dilute acid solution and a resulting mixture is stirred, such that an amorphous micropowder on a surface of the seed crystal is dissolved, a crystal structure is more complete, and primary particles are also thinned under acid leaching conditions, which creates favorable conditions for the continued growth of a crystal plate on the surface of the seed crystal during the subsequent ammonia-free process.
3. In the present disclosure, ammonia water is not used during the subsequent growth stage, and particles can still continue to grow along the morphology of the seed crystal and retain a relatively high sphericity, which leads to no ammonia-containing wastewater and thus reduces a wastewater treatment cost.
4. The ternary precursor prepared by the present disclosure has thin primary particles and large SSA, which helps to improve a reaction activity, a contact area with other materials, and the uniformity of a cathode material, thereby giving a high output capacity.

BRIEF DESCRIPTION OF THE DRAWINGS

The present disclosure is further described below with reference to accompanying drawings and examples.

DETAILED DESCRIPTION

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, a ternary precursor was prepared, and a specific preparation process was as follows:

(1) Nickel sulfate, cobalt sulfate, and manganese sulfate were dissolved in pure water in a ratio of 83:12:5 to prepare a mixed metal salt solution A, and then the mixed metal salt solution A, ammonia water, and a sodium hydroxide solution were simultaneously added to a reactor for precipitation; a resulting mixture was stirred to allow a reaction at a pH of 12.0 and a temperature of 60 °C; after a particle size D50 reached 4 μm, a resulting precipitate was aged, filtered out, and washed to obtain a precursor seed crystal with high sphericity; the precursor seed crystal was filtered out and added to a 1 mol/L dilute hydrochloric acid solution, and a resulting mixture was stirred for 1 h; and an acidified seed crystal was filtered out and washed.

(2) Nickel sulfate, cobalt sulfate, and manganese sulfate were dissolved in pure water in a ratio of 83:12:5 to prepare a mixed metal salt solution B; an acidified seed crystal and an appropriate amount of pure water were added to a reactor, a resulting mixture was stirred and heated (keeping at 65 °C), and nitrogen was continuously introduced into the reactor to prevent oxidation; and a small amount of a sodium hydroxide solution was added to the reactor to adjust a pH in the reactor to 10.0, and then the sodium hydroxide solution and the mixed metal salt solution B were simultaneously pumped into the reactor for co-precipitation, where a reaction pH was constantly adjusted to control the nucleation and growth of precursor particles, a supernatant in the reactor was filtered out through a microporous filtration device to keep a liquid level in the reactor stable, a solid content in the material in the reactor continuously increased, and particles continuously grew to a particle size D50 of 10 μm.

(3) Material collection: a material meeting requirements prepared in step (2) was collected into an aging tank, and then filtered, washed, dried, and sieved to obtain a precursor product.

Figure 1:
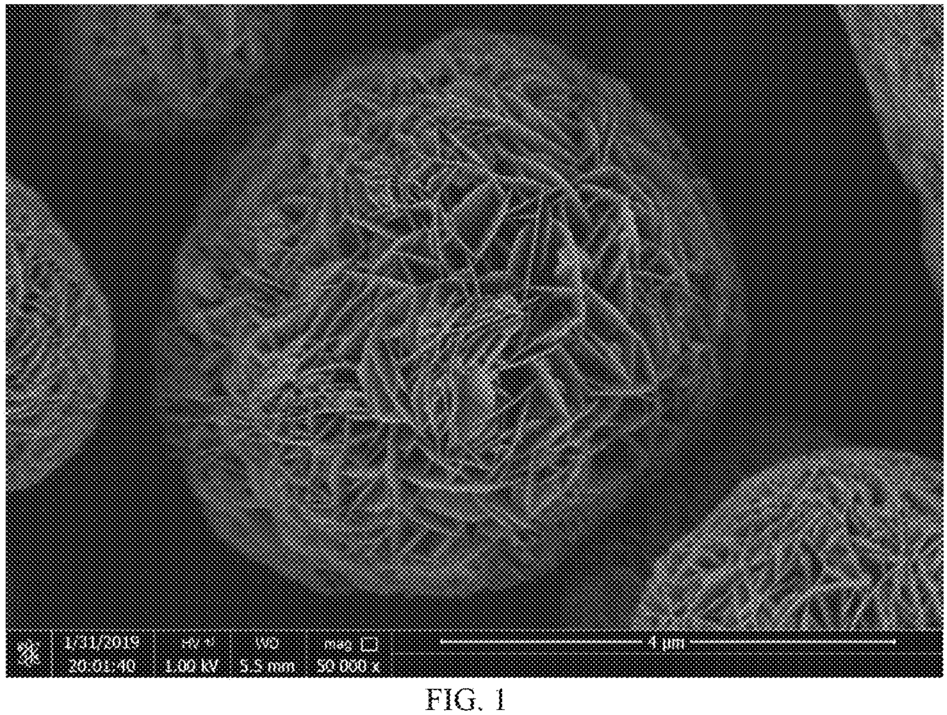
FIG. 1 is a scanning electron microscopy (SEM) image of the precursor product obtained in Example 1 of the present disclosure at a magnification of 50,000.
Figure 2:
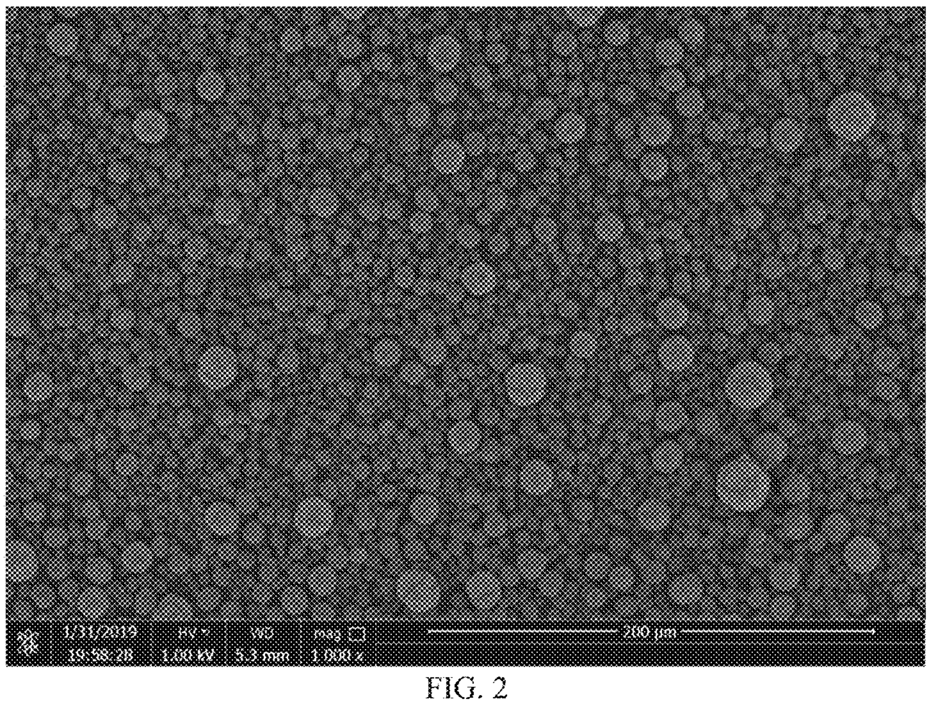
FIG. 2 is an SEM image of the precursor product obtained in Example 1 of the present disclosure at a magnification of 1,000.

FIG. 1 and FIG. 2 are SEM images of the precursor product obtained in Example 1 at magnifications of 50,000 and 1,000, respectively. FIG. 1 shows the surface morphology of a single particle. Since there is no ammonia in the late stage of the reaction, primary particles grow into small flakes without amorphous micropowder among flakes, and secondary particles have high sphericity and show no obvious boundaries on the surface, indicating a complete crystal structure. FIG. 2 shows the overall morphology of a large number of particles, almost all of which are well-grown spherical particles. FIG. 1 and FIG. 2 show that the acidified seed crystal plays an excellent growth-guiding role.

Example 2

In this example, a ternary precursor was prepared, and a specific preparation process was as follows:

(1) Nickel nitrate, cobalt nitrate, and manganese nitrate were dissolved in pure water in a ratio of 92:04:04 to prepare a mixed metal salt solution A, and then the mixed metal salt solution A, ammonia water, and a sodium hydroxide solution were simultaneously added to a reactor for precipitation; a resulting mixture was stirred to allow a reaction at a pH of 11.5 and a temperature of 60 °C; after a particle size D50 reached 4 μm, a resulting precipitate was aged, filtered out, and washed to obtain a precursor seed crystal with high sphericity; the precursor seed crystal was filtered out and added to a 0.8 mol/L dilute sulfuric acid solution, and a resulting mixture was stirred for 1 h; and an acidified seed crystal was filtered out and washed.

(2) Nickel nitrate, cobalt nitrate, and manganese nitrate were dissolved in pure water in a ratio of 82:12:6 to prepare a mixed metal salt solution B; an acidified seed crystal and an appropriate amount of pure water was added to a reactor, a resulting mixture was stirred and heated (keeping at 65 °C), and nitrogen was continuously introduced into the reactor to prevent oxidation; and a small amount of a sodium hydroxide solution was added to the reactor to adjust a pH in the reactor to 10.2, and then the sodium hydroxide solution and the mixed metal salt solution B were simultaneously pumped into the reactor for co-precipitation, where a reaction pH was constantly adjusted to control the nucleation and growth of precursor particles, a supernatant in the reactor was filtered out through a microporous filtration device to keep a liquid level in the reactor stable, a solid content in the material in the reactor continuously increased, and particles continuously grew to a particle size D50 of 10 μm.

(3) Material collection: a material meeting requirements prepared in step (2) was collected into an aging tank, and then filtered, washed, dried, and sieved to obtain a precursor product.

Example 3

In this example, a ternary precursor was prepared, and a specific preparation process was as follows:

(1) Nickel sulfate, cobalt sulfate, and manganese sulfate were dissolved in pure water in a ratio of 8:1:1 to prepare a mixed metal salt solution A, and then the mixed metal salt solution A, ammonia water, and a sodium hydroxide solution were simultaneously added to a reactor for precipitation; a resulting mixture was stirred to allow a reaction at a pH of 11.8 and a temperature of 65 °C; after a particle size D50 reached 2 μm, a resulting precipitate was aged, filtered out, and washed to obtain a precursor seed crystal with high sphericity; the precursor seed crystal was filtered out and added to a 0.5 mol/L dilute nitric acid solution, and a resulting mixture was stirred for 1 h; and an acidified seed crystal was filtered out and washed.

(2) Nickel sulfate, cobalt sulfate, and manganese sulfate were dissolved in pure water in a ratio of 6:2:2 to prepare a mixed metal salt solution B; an acidified seed crystal and an appropriate amount of pure water were added to a reactor, a resulting mixture was stirred and heated (keeping at 65 °C), and nitrogen was continuously introduced into the reactor to prevent oxidation; and a small amount of a sodium hydroxide solution was added to the reactor to adjust a pH in the reactor to 10.0, and then the sodium hydroxide solution and the mixed metal salt solution B were simultaneously pumped into the reactor for co-precipitation, where a reaction pH was constantly adjusted to control the nucleation and growth of precursor particles, a supernatant in the reactor was filtered out through a microporous filtration device to keep a liquid level in the reactor stable, a solid content in the material in the reactor continuously increased, and particles continuously grew to a particle size D50 of 5 μm.

(3) Material collection: a material meeting requirements prepared in step (2) was collected into an aging tank, and then filtered, washed, dried, and sieved to obtain a precursor product.

Example 4

(1) Nickel acetate, cobalt acetate, and manganese acetate were dissolved in pure water in a ratio of 65:15:20 to prepare a mixed metal salt solution A, and then the mixed metal salt solution A, ammonia water, and a sodium hydroxide solution were simultaneously added to a reactor for precipitation; a resulting mixture was stirred to allow a reaction at a pH of 12.0 and a temperature of 60 °C; after a particle size D50 reached 1.5 μm, a resulting precipitate was aged, filtered out, and washed to obtain a precursor seed crystal with high sphericity; the precursor seed crystal was filtered out and added to a 0.4 mol/L dilute hydrochloric acid solution, and a resulting mixture was stirred for 1 h; and an acidified seed crystal was filtered out and washed.

(2) Nickel acetate, cobalt acetate, and manganese acetate were dissolved in pure water in a ratio of 55:12:33 to prepare a mixed metal salt solution B; an acidified seed crystal and an appropriate amount of pure water were added to a reactor, a resulting mixture was stirred and heated (keeping at 55 °C), and nitrogen was continuously introduced into the reactor to prevent oxidation; and a small amount of a sodium hydroxide solution was added to the reactor to adjust a pH in the reactor to 10.4, and then the sodium hydroxide solution and the mixed metal salt solution B were simultaneously pumped into the reactor for co-precipitation, where a reaction pH was constantly adjusted to control the nucleation and growth of precursor particles, a supernatant in the reactor was filtered out through a microporous filtration device to keep a liquid level in the reactor stable, a solid content in the material in the reactor continuously increased, and particles continuously grew to a particle size D50 of 3 μm.

(3) Material collection: a material meeting requirements prepared in step (2) was collected into an aging tank, and then filtered, washed, dried, and sieved to obtain a precursor product.

Example 5

(1) Nickel sulfate, cobalt sulfate, and manganese sulfate were dissolved in pure water in a ratio of 5:2:3 to prepare a mixed metal salt solution A, and then the mixed metal salt solution A, ammonia water, and a sodium hydroxide solution were simultaneously added to a reactor for precipitation; a resulting mixture was stirred to allow a reaction at a pH of 11.0 and a temperature of 70 °C; after a particle size D50 reached 1.5 μm, a resulting precipitate was aged, filtered out, and washed to obtain a precursor seed crystal with high sphericity; the precursor seed crystal was filtered out and added to a 0.3 mol/L dilute sulfuric acid solution, and a resulting mixture was stirred for 1 h; and an acidified seed crystal was filtered out and washed.

(2) Nickel sulfate, cobalt sulfate, and manganese sulfate were dissolved in pure water in a ratio of 3:3:3 to prepare a mixed metal salt solution B; an acidified seed crystal and an appropriate amount of pure water were added to a reactor, a resulting mixture was stirred and heated (keeping at 65 °C), and nitrogen was continuously introduced into the reactor to prevent oxidation; and a small amount of a sodium hydroxide solution was added to the reactor to adjust a pH in the reactor to 9.8, and then the sodium hydroxide solution and the mixed metal salt solution B were simultaneously pumped into the reactor for co-precipitation, where a reaction pH was constantly adjusted to control the nucleation and growth of precursor particles, a supernatant in the reactor was filtered out through a microporous filtration device to keep a liquid level in the reactor stable, a solid content in the material in the reactor continuously increased, and particles continuously grew to a particle size D50 of 4 μm.

(3) Material collection: a material meeting requirements prepared in step (2) was collected into an aging tank, and then filtered, washed, dried, and sieved to obtain a precursor product.

Comparative Example 1

In this comparative example, a ternary precursor was prepared. A preparation process was different from Example 1 in that the seed crystal obtained in step (1) was directly filtered out and washed without acidification treatment.

Figure 3:
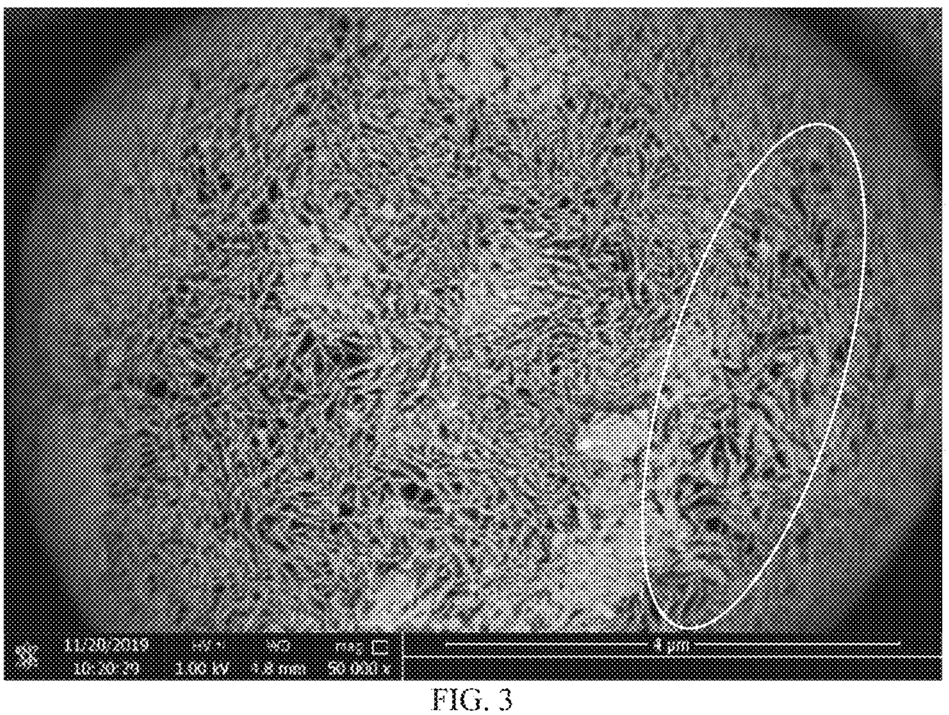
FIG. 3 is an SEM image of the precursor product obtained in Comparative Example 1 of the present disclosure at a magnification of 50,000.
Figure 4:
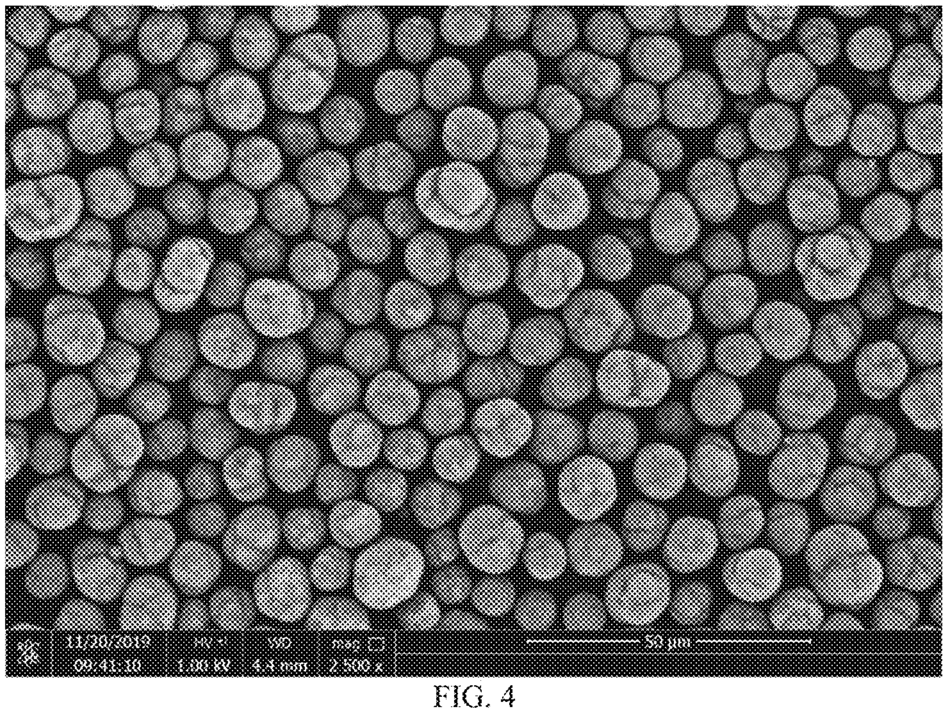
FIG. 4 is an SEM image of the precursor product obtained in Comparative Example 1 of the present disclosure at a magnification of 1,000.

FIG. 3 and FIG. 4 are SEM images of the precursor product obtained in Comparative Example 1 at magnifications of 50,000 and 1,000, respectively. FIG. 1 shows the surface morphology of a single particle. Since there is no ammonia in the late stage of the reaction, primary particles grow into small flakes with a large amount of amorphous micropowder among flakes, and secondary particles have poor sphericity and show an obvious boundary on the surface, indicating different crystalline orientations and an incomplete crystal structure. FIG. 4 shows the overall morphology of a large number of particles, and it can be seen that most of the particles are deformed agglomerated secondary particles with a large number of boundaries. It shows that the unacidified seed crystal does not play a prominent growth-guiding role, and new crystal nuclei appear in the subsequent ammonia-free reaction process, some of which voluntarily agglomerate into deformed seed crystals and then continue to grow, and some of which adhere to a surface of the original seed crystal, thereby reducing the sphericity and crystallinity of particles and ultimately resulting in low sphericity of final particles.

Test Example

Table 1 shows the performance data of the precursor products obtained in the examples and comparative example.

TABLE 1

| Sample | D10 (μm) | D50 (μm) | D90 (μm) | BET ($m^2/g$) | TD ($g/cm^3$) | Initial specific discharge capacity at 1 C (mAh/g) |
|---|---|---|---|---|---|---|
| Example 1 | 4.90 | 9.99 | 16.70 | 21.2 | 1.36 | 189 |
| Example 2 | 5.74 | 9.72 | 15.04 | 16.3 | 1.42 | 202 |
| Example 3 | 3.20 | 5.06 | 8.12 | 29.7 | 1.25 | 177 |
| Example 4 | 1.79 | 3.03 | 5.08 | 42.3 | 1.04 | 164 |
| Example 5 | 2.46 | 4.04 | 6.59 | 33.5 | 1.07 | 158 |
| Comparative Example 1 | 5.36 | 9.92 | 15.93 | 24.1 | 1.34 | 183 |

It can be seen from Table 1 that in Comparative Example 1, as no acidification treatment is conducted, the initial specific discharge capacity at 1 C is 6 mAh/g lower than that of Example 1.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A preparation method of a ternary precursor, comprising the following steps:

S1: mixing a first metal salt solution containing a soluble nickel salt, a soluble cobalt salt and a soluble manganese salt with ammonia water and a sodium hydroxide solution, adjusting pH, and performing a reaction under heating and stirring to obtain a slurry; aging and filtering the slurry to obtain a precursor seed crystal;

S2: adding the precursor seed crystal to a dilute acid solution, and stirring and filtering a resulting mixture to obtain an acidified seed crystal, the dilute acid solution is one or more selected from the group consisting of hydrochloric acid, sulfuric acid, nitric acid, and perchloric acid; and the dilute acid solution has a concentration of 0.1-1 mol/L; and S3: mixing a second metal salt solution containing a soluble nickel salt, a soluble cobalt salt and a soluble manganese salt with a sodium hydroxide solution and the acidified seed crystal, adjusting pH, and performing a reaction under heating and stirring; aging, filtering in the absence of ammonia water, and drying a resulting slurry to obtain the ternary precursor, in S3, the heating is conducted at 40-80 °C, the pH is adjusted to 9.0-12.0.

2. The preparation method according to claim 1, wherein in S1, the pH is adjusted to 10-13.

3. The preparation method according to claim 1, wherein in S1, the heating is conducted at 40-80 °C.

4. The preparation method according to claim 1, wherein in S1, particles in the slurry have a particle size D50 of 1.5-4 μm.

5. The preparation method according to claim 1, wherein in S2, the stirring is conducted for 0.5-2 h.

6. The preparation method according to claim 1, wherein in S3, particles in the resulting slurry have a particle size D50 of 3-12 μm.

7. The preparation method according to claim 1, wherein S3 comprises: adding the acidified seed crystal and water to a reactor, and starting stirring and heating; introducing an inert gas, and adding the sodium hydroxide solution to the reactor to adjust the pH; and simultaneously pumping the sodium hydroxide solution and the second metal salt solution to perform the reaction; during the reaction, adjusting the pH constantly to control the nucleation and growth of particles of the ternary precursor, filtering out a supernatant in the reactor to keep a liquid level highly stable; the particles continuously growing until reach a target particle size.

* * * * *